(No Model.)
G. BURNHAM & A. GODDARD.
DRILLING MACHINE.
No. 319,952. Patented June 16, 1885.
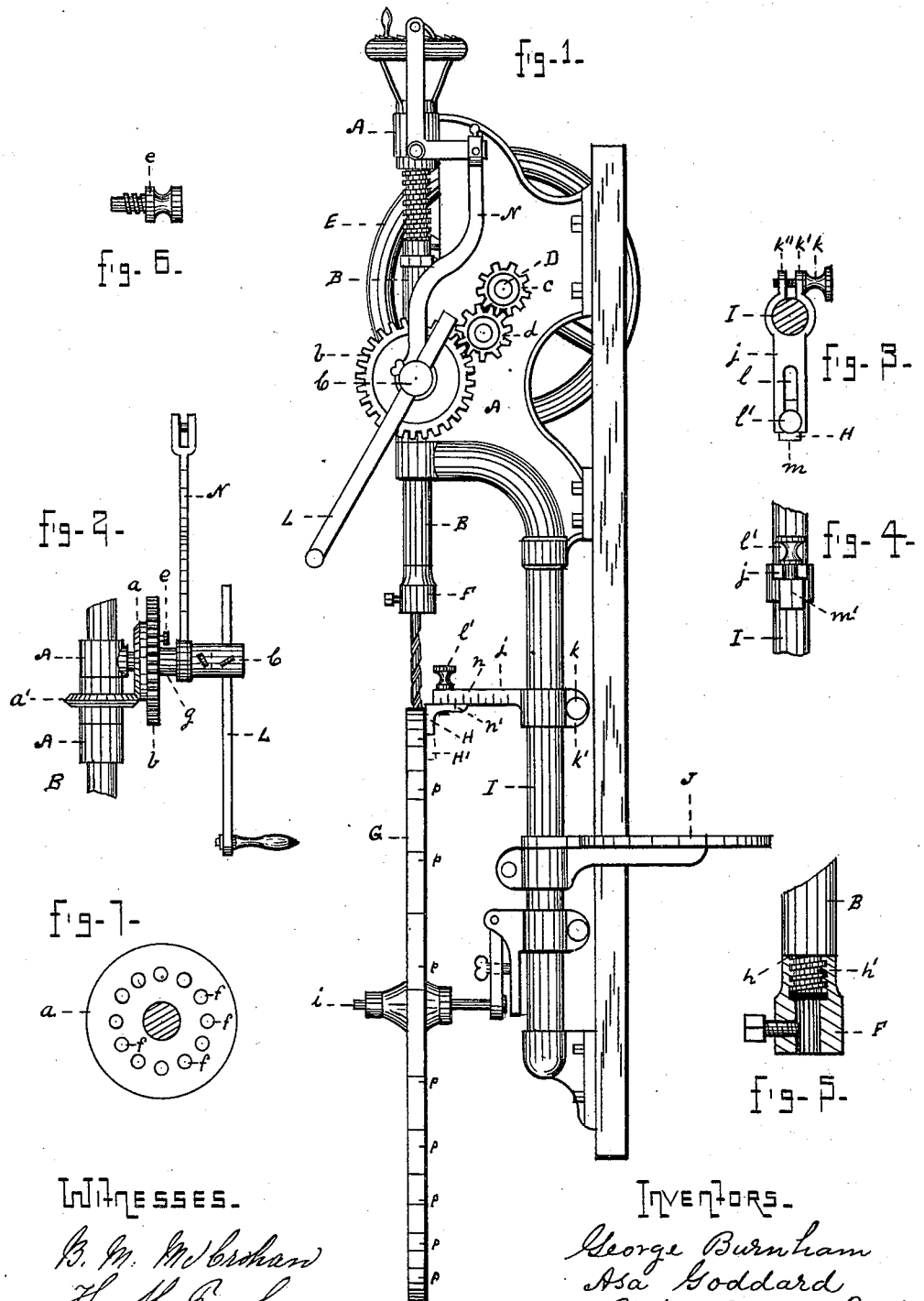
Witnesses.
B. M. McCrohan
H. M. Fowler
Inventors.
George Burnham
Asa Goddard
By Rufus Bennett Fowler
Atty

UNITED STATES PATENT OFFICE.

GEORGE BURNHAM AND ASA GODDARD, OF WORCESTER, MASSACHUSETTS.

DRILLING-MACHINE.

SPECIFICATION forming part of Letters Patent No. 319,952, dated June 16, 1885.

Application filed April 28, 1884. (No model.)

*To all whom it may concern:*

Be it known that we, GEORGE BURNHAM and ASA GODDARD, citizens of the United States, residing at Worcester, in the county of Worcester and State of Massachusetts, have invented a new and useful Improvement in Drilling-Machines, of which the following is a specification.

Our invention consists in a spindle adapted to receive drill-holding "heads" or sockets of varying size, in means for detaching the balance-wheel, in providing a rest for drilling the rims of carriage-wheels and similar articles, and in providing gages by which the work may be properly placed beneath the drill.

The accompanying drawings illustrate a drilling-machine embodying the several features of our invention, and in which—

Figure 1 shows a side view of the drilling-machine. Fig. 2 is a detached view of the crank-shaft and detachable gear. Figs. 3 and 4 show top and front views of the rest. Fig. 5 is a portion of the spindle; Fig. 6, a view of the screw $e$, and Fig. 7 shows the side of the beveled gear $a$.

Similar letters refer to similar parts in the several views.

A A denote the frame; B, the drill-spindle, driven by the beveled gears $a$ $a'$ in the usual manner in this class of drilling-machines.

Upon the crank-shaft C is a spur-gear, $b$, which drives the shaft D, carrying a balance-wheel, E, through the pinion $c$ and intermediate pinion, $d$, turning upon a stud attached to the frame. The spur-gear $b$ is loose on the shaft C, but is caused to rotate with the shaft C and the beveled gear $a$, attached to the shaft by the screw $e$, which is held in the gear $b$, and enters a hole in the side of the beveled gear $a$. The screw $e$ is threaded only a portion of its length, leaving the point blank to enter the holes $f$ in the beveled gear $a$. The screw-thread in the gear $b$ should be long enough to allow the screw $e$ to be withdrawn from the beveled gear and still remain in the gear $b$. For convenience, we form a series of holes, $f$, in the side of the beveled gear, so as to obviate the necessity of turning the gears to bring the screw in line with the hole. A collar, $g$, serves to hold the gear $b$ in place when detached from the gear $a$. When it is desired to connect the balance-wheel, the screw $e$ is brought against the side of the gear $a$ with a slight pressure, and the gear turned until the end of the screw finds one of the holes $f$, when it is screwed into the hole and becomes the driver by which the motion of the gear $a$ is imparted to the balance-wheel shaft.

Upon the end of the drill-spindle B, instead of the usual socket and set-screw for holding the shank of the drill, we form a shoulder, $h$, and screw-thread $h'$, adapted to receive a detachable head or socket, F, which may thus be exchanged for others with holes of varying sizes, which is a great convenience, as the shanks of drills used by blacksmiths and carriage-makers vary in different sections of the country, the "standard" size in some sections being one-half inch and in others five-eighths inch in diameter. This mode of construction also allows a chuck to be used upon the drill-spindle. In drilling the rims or tires of carriage-wheels we place the hub of the wheel upon a pin, $i$, supporting the wheel G in proper position beneath the drill, as shown in Fig. 1, and we hold the rim of the wheel steadily in position, and prevent any lateral motion of the same by means of the rest H, extending from and attached to the post I of the drill. This rest may be attached by suitable means to the post I, and may be made in any suitable form to allow a firm contact with the rim of the wheel. In case the work is held upon a table in the ordinary manner, instead of on a pin, $i$, the rest H will frequently be found very advantageous in affording a support for the side of the work. Our rest is formed of the horizontal arm $j$, sliding on the post I, so that its vertical position may be varied, and held by the binding-screw $k$, passing through the lug $k'$ and entering a screw-thread in the lug $k''$, by which they are drawn together, clamping the arm upon the post. The arm $j$ extends horizontally as far as possible and clears the largest-sized drills used in the machine. At the outer end the arm is bifurcated by a vertical slot, $l$, and upon the under side are ribs, forming ways for the sliding rest H, which is securely held in position against the arm $j$ by the thumb-screw $l'$, passing through the slot and entering a screw-thread in the rest H. The face $m$ or front of the rest should extend far enough beyond the screw $l$ so that the face may be brought out as far as the center or axial line of the drill-spindle, and upon the face we place a vertical "center line" or gage, $m'$. In use the arm $j$ is brought into proper vertical position, and is clamped with a slight pressure on the post by the screw $k'$. The rest H is moved out until its face $m$ is brought in line with the center of the drill. The arm $j$ is then moved about the post I until the center line, $m'$, coincides with the center of the drill. The arm $j$ is then fastened to the post I by the binding-screw $k$ and the rest H moved back toward the post I to the position desired, and fastened in place by the screw $l'$.

By means of the graduated side $n$ on the arm $j$, and an index-mark, $n'$, on the rest we are able to place the rest at any given distance from the axial line of the drill without measurement. This graduation of the rest is a great advantage in many kinds of work, especially in drilling the rims of wagon-wheels. For instance, if the rim should be two inches in width, by moving the rest back one inch, as indicated by the graduated side $n$, all the holes will be brought in the center of the rim, and in case a mark or marks, as at $p\ p$, be made on the edge of the rim, the holes may all be brought exactly opposite these marks by bringing the marks against the center line, $m'$, on the face of the rest. In case the swinging table J is brought under the drill and against the rest H, any work held on the table to be drilled could be "centered" from one edge in the same manner. The rest H may be extended downward, as shown, by the broken line H', so as to allow it to be seized by the fingers while the thumb is brought against the rim, or the thumb may be brought against the outside of the rim and the fingers placed around the binding-screw $l'$.

We do not confine ourselves to the specific devices shown for attaching the gear $b$ to the crank-shaft, as other means may be employed, such as a sliding clutch on the crank-shaft; neither do we confine ourselves to the use of the intermediate gear, $d$, as the crank and balance-wheel shafts may be geared directly together, if desired.

What we claim as our invention, and desire to secure by Letters Patent, is—

1. The combination, with the drill-spindle B of a drilling-machine, bevel gears $a$ and $a'$, and crank-shaft C, of a gear, $b$, loose on the crank-shaft, and having a screw, $e$, entering holes in the gear $a$, and connected balance-wheel shaft, as and for the purpose set forth.

2. In a drilling-machine, the combination, with a crank-shaft, C, of bevel-gears $a$ and $a'$, and drill-spindle B, said drill-spindle having a shoulder, $h$, and screw-thread $h'$, and a detachable head or socket, F, as and for the purpose set forth.

3. In a drilling-machine, the combination, with a rotating drill-spindle and a table or means for supporting the work beneath said drill-spindle, of an arm extending laterally from the post of the drilling-machine, between the drill-spindle and the table or means for supporting the work, and adapted to serve as a rest or support to prevent lateral movement of the work during the operation of drilling, substantially as described, and for the purpose set forth.

4. In a drilling-machine, the combination, with a rotating drill-spindle, a table or means for supporting the work beneath said drill-spindle, and a post attached to the frame of the machine and parallel with the drill-spindle, of an arm extending laterally from and adjustable on said post, and adapted to serve as a rest or support to prevent lateral motion of the work during the operation of drilling, as and for the purpose set forth.

5. The combination, with the rotating drill-spindle and connected driving mechanism, of an arm, $j$, attached to the post of the drilling-machine and carrying a horizontally-sliding rest, H, and means of attachment to the arm $j$, as and for the purpose set forth.

6. The combination, with a rotating drill-spindle and connected driving mechanism, of a graduated arm, $j$, attached to the post of the drilling-machine, and a horizontally-sliding rest, H, as and for the purpose set forth.

7. The combination, with a rotating drill-spindle and connected driving mechanism, of an arm attached to the post of the drilling-machine, having a vertical center line, $m'$, parallel with the axial line of the drill, as and for the purpose set forth.

GEO. BURNHAM.
ASA GODDARD.

Witnesses:
GEO. E. SMITH,
RUFUS B. FOWLER.